United States Patent
Belokin

(10) Patent No.: US 9,435,371 B2
(45) Date of Patent: Sep. 6, 2016

(54) VARIED DIAMETER SUCTION CUP

(75) Inventor: Paul Belokin, Denton, TX (US)

(73) Assignee: Displays by Martin Paul, Inc.—Creative Center, Denton, TX (US)

( * ) Notice: Subject to any disclaimer, the term of this patent is extended or adjusted under 35 U.S.C. 154(b) by 2511 days.

(21) Appl. No.: 11/544,675

(22) Filed: Oct. 10, 2006

(65) Prior Publication Data

US 2008/0083859 A1  Apr. 10, 2008

(51) Int. Cl.
*A45D 42/14*  (2006.01)
*F16B 47/00*  (2006.01)

(52) U.S. Cl.
CPC ..................... *F16B 47/00* (2013.01)

(58) Field of Classification Search
CPC ....................................................... F16B 47/00
USPC .............................................. 248/205.2, 362
See application file for complete search history.

(56) References Cited

U.S. PATENT DOCUMENTS

| | | | | |
|---|---|---|---|---|
| 2,974,820 A | * | 3/1961 | Romei .......................... | 220/575 |
| 3,042,959 A | * | 7/1962 | Strom ........................... | 16/86 A |
| 3,675,886 A | * | 7/1972 | Kampmier ..................... | 248/363 |
| 5,714,215 A | * | 2/1998 | Sheffield et al. ............ | 428/34.1 |
| 5,964,437 A | * | 10/1999 | Belokin et al. ............. | 248/205.5 |
| 2003/0161991 A1 | * | 8/2003 | Henderson ....................... | 428/99 |
| 2003/0230694 A1 | * | 12/2003 | Kalb ............................. | 248/363 |
| 2006/0284043 A1 | * | 12/2006 | Paradise et al. .............. | 248/362 |
| 2007/0069089 A1 | * | 3/2007 | Christopherson .......... | 248/205.5 |

* cited by examiner

*Primary Examiner* — Amy Sterling
(74) *Attorney, Agent, or Firm* — Jack A. Kanz

(57) ABSTRACT

Suction cups with non-circular peripheral edges are formed with peripheral edges which are of uniform thickness regardless of the radial distance of the peripheral edge from the center of the cup body.

9 Claims, 1 Drawing Sheet

VARIED DIAMETER SUCTION CUP

This invention relates to supports for mounting objects such as display shelves, racks and the like on substantially flat surfaces without damaging or permanently disfiguring the mounting surface. More particularly, it relates to suction cups which rely on atmospheric pressure and surface friction for removeably securing the cups to substantially flat surfaces and, more particularly, to suction cups which have a non-circular peripheral geometry.

Suction cups are commonly used to mount and secure objects to flat smooth surfaces such as the surfaces of glass, plastic, Formica®, glazed tile, metal, etc. The typical suction cup includes a cup body supporting a mounting stem. The cup body is generally in the form of a disc having a concave inner surface defined by a circular periphery extending radially from a central stem. Typically, the stem is integrally formed on the external surface of the body and used as the place of attachment for the object to be supported by the suction cup. The body of the suction cup is usually made of rubber, plastic or other material having sufficiently resilient properties so that when the concave body is pressed against a smooth surface the periphery of the cup expands and the volume of concavity is reduced. Air or other fluid in the cup is expelled so that the inner surface of the body forms a tight seal against the smooth surface of a supporting wall, door or the like. Atmospheric pressure outside the body retains the suction cup body against the supporting surface. When the seal between the cup and the surface on which it is mounted is broken, fluids such as air or the like rush into the cavity, releasing the suction attachment to the surface and the resilient material of the suction cup body returns to its relaxed concave condition.

Since suction cups employ a cup-like body which must be compressed to expel fluid from the concavity, the natural resilience of the body material causes the body to attempt to return to its natural (formed) cup-like shape. If the peripheral edges of the cup remain sealed with the mounting surface, the cup remains securely attached. However, if leakage occurs between the cup and the mounting surface, the cup is automatically disengaged from the mounting surface. Because of the shape of the body, the cup has a natural tendency to become disengaged when leakage occurs. For this reason, suction cups cannot be reliably secured to roughened surfaces or the like.

In order to permit the periphery of the cup to expand uniformly when the cup is compressed, and to insure that the peripheral edges of the cup maintain uniform contact (and therefore uniform sealing relationship) with the surface on which it is mounted, the geometric periphery of conventional suction cups is generally circular. Unfortunately, when multiple suction cups are required to support a particular object, the density of cups is limited by the diameters of the circular cups. Furthermore, although suction cups are often made from substantially transparent materials, circular cups, even when mounted on transparent materials such as glass, etc., remain prominently visible and may present aesthetically unappealing distractions when used to support objects which are non-circular and/or otherwise present an appearance which is not complimentary or aesthetically consistent with circular support structures.

In order to increase the permissible density of suction cups on a supporting surface (and for aesthetic purposes), suction cups have been formed (or, in some cases, the peripheral edges of suction cups trimmed) to provide suction cup bodies with non-circular peripheral edges. For example, suction cup bodies which define non-circular peripheral geometries such as rectangular or other geometric shapes have been made for use in unique applications. While cup bodies of unique shapes may permit higher cup densities on a particular surface and may provide aesthetically pleasing appearances, such bodies invariably suffer from reduced adherence because the non-circular peripheral edges do not expand uniformly when the cup is compressed. As a result, the peripheral edges do not provide uniform contact with the mounting surfaces and do not remain sealed with the mounting surface. When leakage occurs between the cup and the mounting surface, the cup tends to return to its concave shape and is automatically disengaged from the mounting surface.

In accordance with the present invention mounting devices are provided in the form of suction cups with non-circular peripheral edges which uniformly adhere to the mounting surface. The suction cup of the invention is similar in many respects to conventional suction cups in that it is formed of a disc-like (but non-circular) body having inner and outer surfaces which converge to define the outer periphery of the cup. A stem or other mounting device is supported on the outer surface of the cup and the inner surface is concave when the cup is in the relaxed state. The thickness of the cup body (the distance from the outer surface to the inner surface) is greatest at the nominal geometric center of the cup and decreases toward the periphery. The periphery of the cup, however, is non-circular. Accordingly, the radial distance from the center of the cup to the edge varies as the peripheral geometry varies. In accordance with the invention, the thickness of the cup body at the periphery remains constant and the thickness of the cup body decreases at a relatively constant rate with distance from the nominal center irrespective of the radial distance from center of cup to peripheral edge. The peripheral edges of the cup, therefore, uniformly adhere to the mounting surface regardless of distance from the cup center and remain firmly sealed regardless of the geometric shape of the cup body periphery. Accordingly, using the principles of the invention cups of any non-circular geometry may be formed which firmly and securely adhere to the mounting surface, permitting cups to be designed with any desired or required peripheral edge geometry.

Other features and advantages of the invention will become more readily understood from the following detailed description taken in connection with the appended claims and attached drawing in which:

Figure 1:
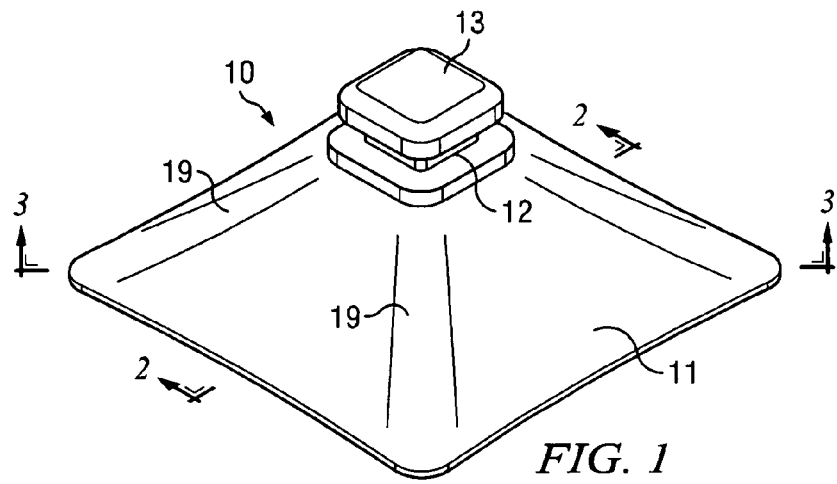
FIG. 1 is a top perspective view of a preferred embodiment of a suction cup embodying the principles of the invention.

The attached drawing is incorporated into and forms part of the specification to illustrate exemplary embodiments of the invention. For clarity of illustration, like reference numerals designate corresponding elements throughout the drawing. It will be recognized that the principles of the invention may be utilized and embodied in many and various forms. In order to demonstrate these principles, the invention is described herein by reference to specific preferred embodiments. The invention, however, is not limited to the specific forms illustrated and described.

While the principles of the invention are applicable to suction cups of almost any non-circular geometry, the preferred embodiment illustrated in the drawing comprises a cup 10 in which the cup body is square in top plan dimensions. As illustrated in FIG. 1, the suction cup body 11 supports a mounting device in the form of a T-shaped stem having a post 12 with an expanded head 13 substantially centrally located on the outer surface 15. In the relaxed (normal) state, the inner surface 16 of cup 10 is concave. As with conventional suction cups, when the cup 10 is compressed to expel air from the internal cavity, the normal tendency of the cup to return to its relaxed condition creates a lowered pressure inside the cavity and, so long as the outer edges of the cup body remain sealed against the supporting wall, the suction cup remains adhered to the supporting wall. However, if sealing contact is disrupted at the periphery of the cup, air leaks into the interior cavity and adherence is lost.

In conventional suction cups having circular peripheral geometries, the thickness of the peripheral edge is uniform. Since the inner surface of the cup is concave, the periphery must expand when the cup cavity is compressed. When the cup is circular, the expansion is uniform and the edges uniformly seal against the supporting wall. However, if the peripheral edges are not of uniform thickness (as in circular cups which have been trimmed to other geometries) the peripheral edges do not expand uniformly and uniformly constant edge sealing is not maintained.

Figure 2:
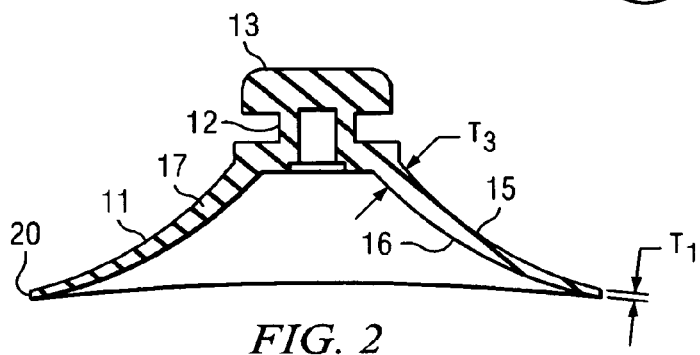
FIG. 2 is a sectional view of the suction cup of FIG. 1 taken through line 2-2.
Figure 3:
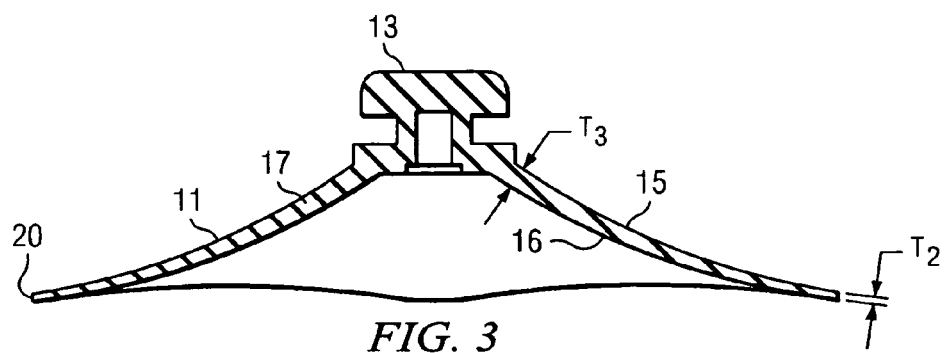
FIG. 3 is a sectional view of the suction cup of FIG. 1 taken through line 3-3.

In order to insure that uniform edge sealing is effected in suction cups of non-circular geometries, the suction cups of the invention are formed with non-circular edge geometries in which the edge thickness is relatively constant around the periphery of the cup regardless of the radial distance of the edge from the center of the cup. As illustrated in FIGS. 2 and 3, the body of the cup is thickest at the nominal center 17 and thinnest at the edge 20.

In the preferred embodiment, the thickness of the cup body 11 decreases uniformly with distance from the thick central root portion (the nominal center 17) to the edge 20. However, in order to insure that the peripheral edges uniformly adhere to the supporting surface when the cup is compressed, the thickness of the peripheral edge 20 must remain relatively constant. Accordingly, the rate at which the outer surface 15 converges toward the inner surface 16 (or vice versa) varies with the radial distance of the edge 20 from the center 17 of the cup. As illustrated in FIGS. 2 and 3, $T_1$ (the thickness of the edge 20 at the shortest radial distance from the center) approximately equals $T_2$ (the thickness of the edge 20 at the farthest radial distance from the center 17). In order to maintain this relationship, the rate of decrease in thickness must vary with distance from edge to center.

Figure 4:
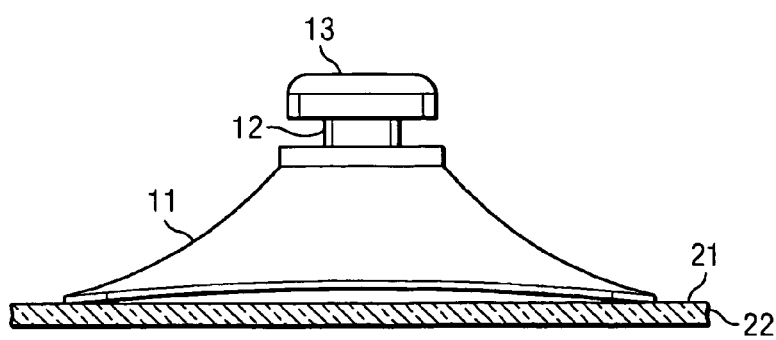
FIG. 4 is a side elevational view of the suction cup of FIG. 1 in the relaxed condition resting on a mounting surface.

Because of the varying rates of decrease in thickness, the edges at the longer radial edges will sometimes curve further than the edges at the shorter radial distances when the cup is in the relaxed (normal) condition. Accordingly, as illustrated in FIG. 4, when the cup is resting on a flat surface 21 of a supporting wall 22 the edges 20 at the shorter radial distances will appear to curve upwardly from the flat surface 21 when the cup is in the relaxed condition. However, when the cavity is compressed, the edges 20 expand uniformly to form a uniform seal with the flat surface 21 of supporting wall 22.

While geometry and dimensions may vary depending on intended use, in the embodiment illustrated in the drawing the periphery of the cup is essentially square with each side approximately five (5) cm. in length. The thickness $T_3$ of the wall of body 11 at the central root portion 17 is approximately three (3) to five (5) mm. The thickness $T_1$ of the edge 20 at the smallest radial distance and the thickness $T_2$ of the edge 20 at the largest radial distance are approximately equal and, in the embodiment illustrated, is approximately 0.5 to 1.0 mm.

In the preferred embodiment of the invention $T_1=T_2$ and the rate at which the outer surface 15 and inner surface 16 converge with distance from the nominal center 11 remains constant. Accordingly, the thickness of the wall of body 11 varies according to the diameter of the periphery. When the cup body 11 is made of transparent or translucent materials which have indices of refraction different from that of the surrounding atmosphere, these variations in thickness will usually be apparent in the wall thickness as radially extending lines 19 on the external surface 15 of the cup body 11. These lines 19, however, do not identify abrupt changes in thickness. They merely reflect the varying differences in the thickness of the wall of the body 11.

In the preferred embodiment the body of the suction cup is formed by injection molding using commercial molding vinyl. It will be recognized, however, that various other forming techniques may be used and that the materials used may be any suitable composition such as plastics, rubber and the like which produce a soft, pliable cup body which is substantially impervious to air and tends to return to its relaxed (formed) condition when not compressed.

Suction cups as described above are particularly well adapted for supporting displays, shelves and the like on the inside surfaces of transparent walls of refrigerated vaults and the like. For example, various displays, shelves, etc., are commonly used in refrigerated vaults of convenience stores to store and display goods in a refrigerated environment. Since the mounting surface is usually glass, the mounting attachment must not damage or disfigure the mounting surface but must remain securely adhered thereto for long periods of time under physical load while subjected to wide variations in temperature, humidity, etc. Since such shelves are frequently heavily loaded, a large surface area of the supporting wall must be used to provide sufficient area for attachment of suction cups. However, using the principles of the invention, suction cups with square (or other coincident geometries) may be formed to maximize the density of suction cup surface adhering to wall surface. Likewise, peripheral geometries other than circular may be used to improve the overall appearance of the display.

Utilizing the principles of the invention, cup bodies of any desired peripheral geometry may be formed. For example, the cups may be formed in square or rectangular geometries where high density loading is required or straight edge geometries are desired for appearance purposes. Likewise, the periphery may be formed in other geometric dimensions for aesthetic purposes or to simulate unique designs such as stars, insects, animals and the like. Furthermore, dyes or other compatible materials may be included in the forming material to altar the color, odor, translucence or other physical properties of the suction cup as desired. Nevertheless, so long as the walls of the cup body are formed in accordance with the principles of the invention, such varied geometry peripheral suction cups will securely adhere to most flat surfaces.

While only exemplary embodiments of the invention have been illustrated and described in detail herein, it will be readily recognized that the principles of the invention may be used in various forms using a wide variety of materials to produce suction cups of any desired peripheral configuration. It is to be understood, therefore, that even though numerous characteristics and advantages of the invention have been set forth in detail herein, the foregoing description together with details of the structure and function of the various embodiments, is to be considered illustrative only. Various changes and modifications may be made in detail, especially in matters of shape, size and materials as well as arrangement and combination of parts, without departing from the spirit and scope of the invention as defined by the appended claims.

What is claimed:

1. A suction cup having:
 a) a substantially disc-shaped body defined by a relatively convex outer surface and a relatively concave inner surface joined at the lateral periphery of the body to define a non-circular peripheral edge wherein the thickness of said body at said non-circular edge is substantially constant along the entire periphery of said body; and
 (b) a mounting device substantially centrally located and extending from said convex outer surface;
wherein said cup body defines a nominal center having a first thickness which is greater than the thickness of said body at said non-circular edge and the distance from said outer surface to said inner surface decreases at a relatively uniform rate along the radial distance from said nominal center to said non-circular edge.

2. A suction cup as defined in claim 1 wherein the thickness of said cup body is about 3 mm. to about 5 mm. at said nominal center and about 0.5 mm. to about 1.0 mm. at said non-circular edge.

3. A suction cup as defined in claim 1 wherein said non-circular peripheral edge is rectangular.

4. A suction cup having a body formed of relatively soft, pliable material which is defined by:
 (a) a central portion having a first thickness;
 (b) an outer surface;
 (c) an inner surface which joins said outer surface to define a peripheral edge of non-circular geometry wherein the thickness of said peripheral edge is relatively constant regardless of the radial distance of said peripheral edge from said central portion; and
 (d) a mounting device extending from said central portion of said outer surface;
wherein said first thickness is greater than said thickness of said peripheral edge and the thickness of said body decreases from said central portion to said peripheral edge at a relatively constant rate regardless of the distance of said peripheral edge from said central portion.

5. A suction cup having a substantially disc-shaped body defined by a relatively convex outer surface and a relatively concave inner surface joined at the lateral periphery of the body to define a non-circular peripheral edge wherein:
 (a) the thickness of said body at said non-circular edge is substantially constant along the entire periphery of said body;
 (b) said cup body defines a nominal center having a first thickness which is greater than the thickness of said body at said non-circular edge; and
 (c) the distance from said outer surface to said inner surface decreases at a relatively uniform rate along the radial distance from said nominal center to said non-circular edge.

6. A suction cup as defined in claim 5 wherein the thickness of said cup body is about 3 mm. to about 5 mm. at said nominal center and about 0.5 mm. to about 1.0 mm. at said non-circular edge.

7. A suction cup as defined in claim 5 including support means located on said outer surface at said nominal center.

8. A suction cup as defined in claim 5 wherein said non-circular peripheral edge is rectangular.

9. A suction cup having a body formed of relatively soft, pliable material which is defined by:
 (a) a central portion having a first thickness;
 (b) an outer surface; and
 (c) an inner surface which joins said outer surface to define a peripheral edge of non-circular geometry wherein the thickness of said peripheral edge is less than said first thickness and is relatively constant regardless of the radial distance of said peripheral edge from said central portion;
wherein the thickness of said body decreases from said central portion to said peripheral edge at a relatively constant rate regardless of the distance of said peripheral edge from said central portion.

* * * * *